Patented Sept. 13, 1927.

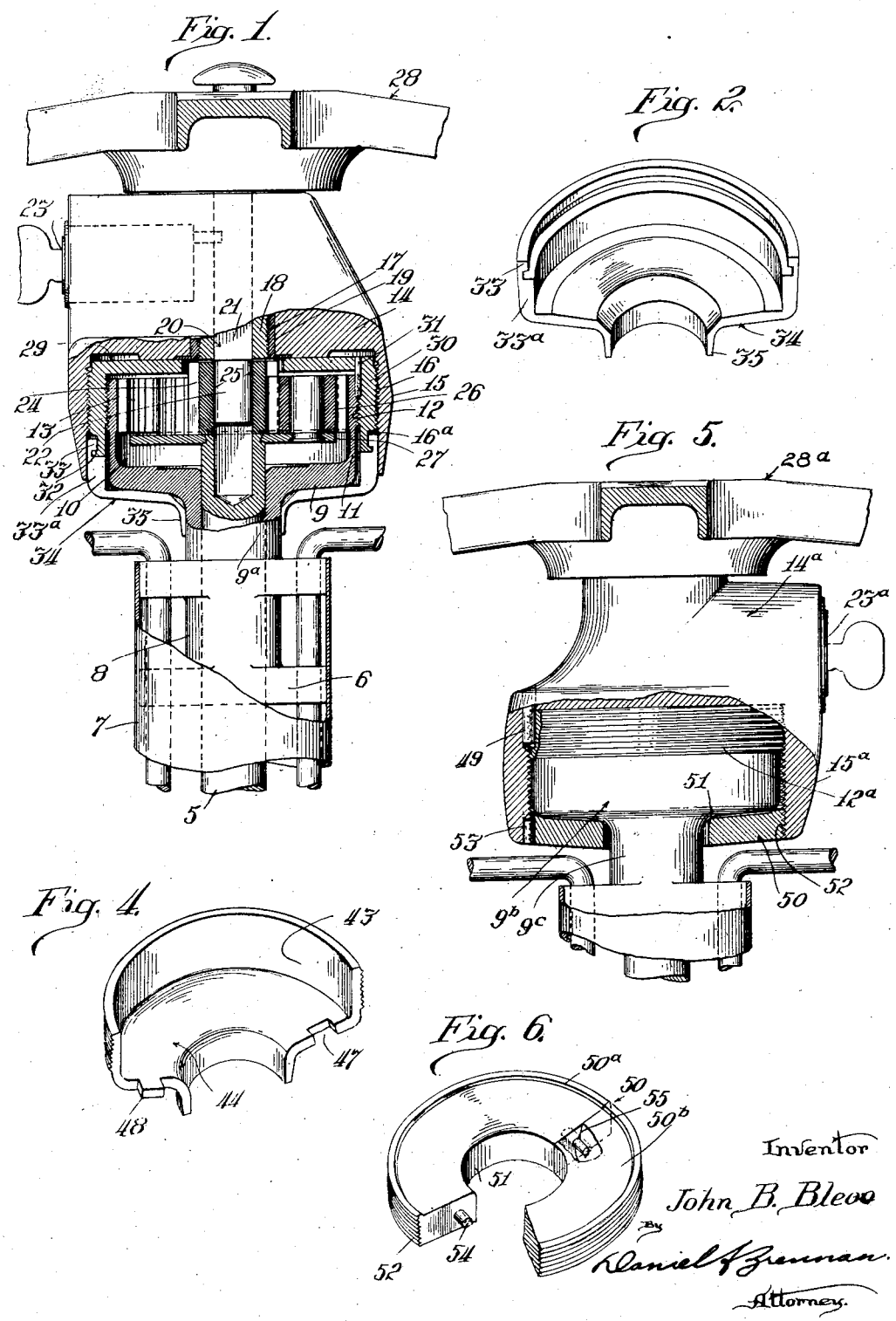

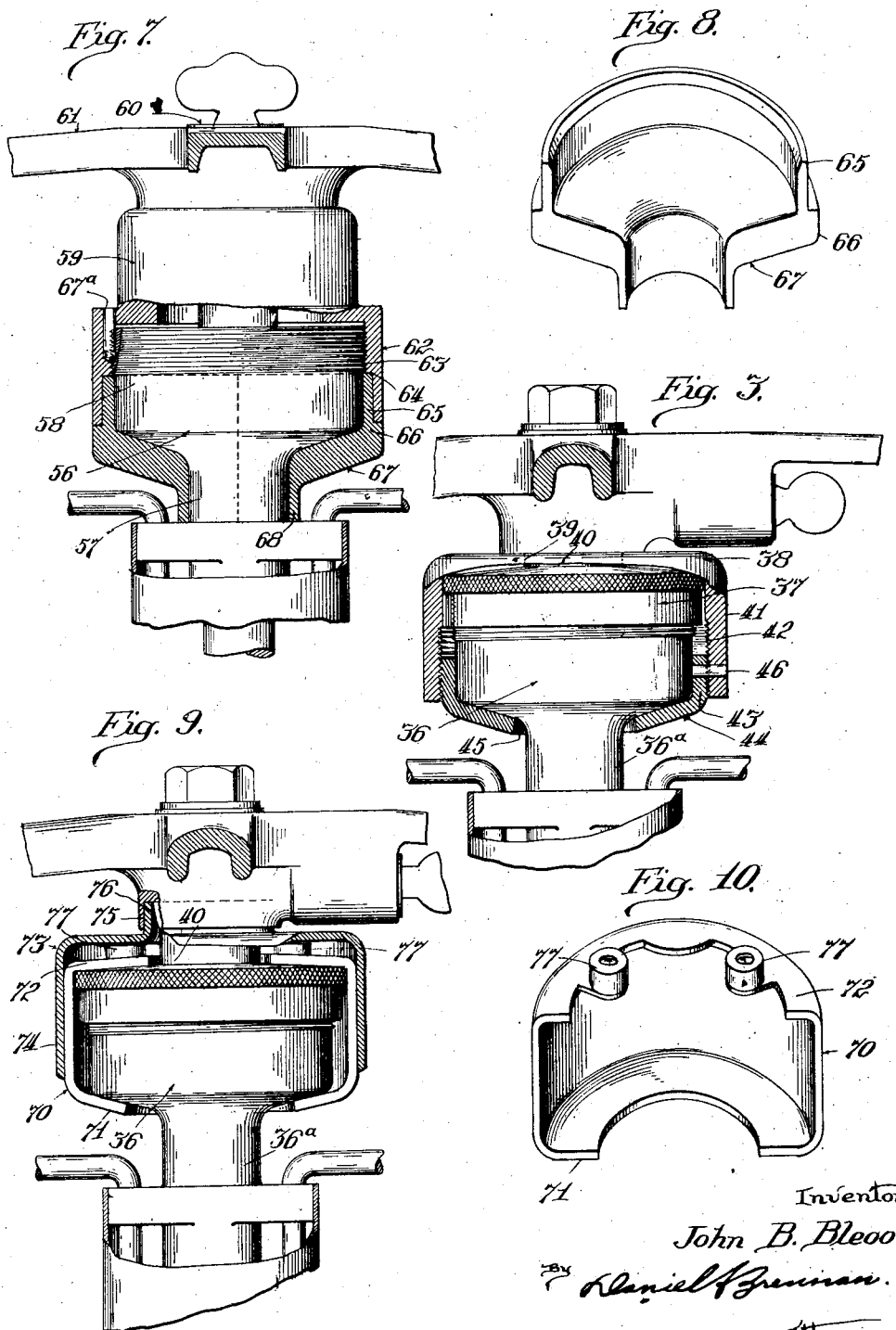

1,642,326

UNITED STATES PATENT OFFICE.

JOHN B. BLEOO, OF CHICAGO, ILLINOIS.

LOCK.

Application filed November 17, 1922. Serial No. 601,626.

This invention relates to locks, such as automobile and other vehicle locks, and more particularly pertains to a new and improved housing for the lock for preventing unauthorized access to the mechanism thereof.

While this invention, for the purpose of convenience, is illustrated as applied to a housing for the locking mechanism of an automobile steering wheel, wherein the wheel is released from the steering post to prevent theft, it will be readily appreciated that it finds a wide field of utility for other purposes.

Among the more important objects and general advantages of this invention are: The provision of an improved unit steering wheel, lock, and mechanism for connecting wheel, lock, and mechanism for connecting to a vehicle steering post, together with an improved housing construction for the latter; the provision of means for preventing unauthorized access to the locking and connecting mechanism; the provision of means for completely and effectively housing the key controlled mechanism for connecting the steering wheel and steering post, whereby to prevent the connection of these latter elements when disconnected to prevent theft; the provision of means for preventing the disassembly or removal of the housing to gain access to the wheel and post connecting mechanism; and the provision of a generally improved, compact and substantial device embodying the features pointed out.

More specifically, the device of this invention relates to and is designed as an improvement in the well-known type of automobile lock which releases steering wheel from the steering post by a key or combination controlled mechanism, the improvement hereinafter described relating particularly to a novel means for preventing manual connection of the key-controlled mechanism independently of the locking device, this being accomplished in some of these devices by opening the housing which encloses the connecting mechanism for the wheel and post, and thus connecting them, and enabling an unauthorized person to drive and steer the vehicle.

The improvement hereinafter described is particularly adapted for use on the type of steering wheel release shown, but is, of course, applicable to other types of connecting and disconnecting devices.

Such other objects and advantages as may be pointed out or appear hereinafter, are attained by the embodiment illustrated in the accompanying drawing, in which:

Figure 1 is a fragmentary vertical sectional view of a device embodying the improvements of this invention;

Figure 2 is a perspective of a part of the device;

Figure 3 is a view similar to Figure 1 of a modified form of this invention;

Figure 4 is a perspective view of a modified form of one of the parts employed in Figure 3;

Figure 5 is a view similar to Figure 1 of a still further modified form of this invention;

Figure 6 is a perspective view of one of the parts employed in Figure 5;

Figure 7 is a vertical sectional view of a still further modified form of this invention;

Figure 8 is a sectional perspective view of a part employed in Figure 7;

Figures 9 and 10 are vertical sectional and perspective views, respectively, of a further alternative form of this invention.

Referring more particularly to the drawing, and first to Figures 1 and 2, wherein a standardized steering post, steering wheel and locking mechanism therefor are fragmentarily illustrated, adapted for the Ford automobile, 5 is the steering post connected at its lower end to steering mechanism (not shown), said post being revoluble in a bearing block 6, fixedly arranged in a casing 7. The bearing block 6 has a sleeve 8 extending upwardly along the steering post and forming a bearing for the post and a support for the lower portion 9 of the housing 10. The lower portion 9 is substantially cup-shaped, and is provided with an upstanding annular flange 11, externally threaded at 12 and provided with a series of internal ring gear teeth 13.

The upper portion 14 of the housing takes the general form of an inverted cup, and is provided with a depending annular flange 15, internally threaded at 16, and fitting over and in spaced relation to the lower portion 9, the flanges 11 and 15 being concentric in spaced relation at 16ª.

The upper portion 14 here is shown as relatively large and heavy, and receiving an internally threaded bushing 17, which latter receives the lower threaded end of a trunnion 18, provided with a squared bore. The trunnion 18 and bushing 17 are locked together for joint rotation in the bore 19, and a vertically displaceable bolt 20 is arranged in the trunnion 18, said bolt having a squared portion 21 and a cylindrical portion 22, a key or permutation controlled mechanism 23, in the portion 14, serving to actuate said bolt.

The upper end of the post is provided with a freely revoluble pinion 24 having a squared recess 25 for reception of the squared portion 21 of the bolt 20, and said pinion meshes with a series of pinions 26 mounted on a plate 27 connected to the post 5. The pinions 26 are in mesh with the ring gear 13. Thus, when the lock mechanism is moved to engage the bolt 20 with the pinion 24 and the wheel 28 rotated the steering post 5 is rotated through the gearing described.

The device of this invention more especially comprises a member 29, substantially cup shaped and having an annular flange 30 internally and externally threaded for engagement between the bottom and top flanges 11 and 15, and with the threads thereon, said member 29 abutting the top portion 14. A case hardened steel pin 31 engages the flanges 30 and 11 for preventing their disconnection.

The flange 30 is provided near its lower end with an external annular groove 32 in which the annular flange 33, formed on the upstanding flange 33ª of the bottom member 34, firmly engages.

The bottom member is preferably formed of two halves, for convenience in assembling, as shown in Figure 2, and is arranged to snugly encompass the lower part 9 of the housing 10. An axial collar 35 is formed on the bottom member 34 and encircles the sleeve portion 9ª of the portion 9 when the two parts of said bottom member are joined.

Referring now to the alternative form of this invention shown in Figure 3, there is illustrated the lower part 36 of a housing closed by a cap 37, which threads onto the top of said part 36. Mechanism similar to that shown in Figure 1 may be encased by the housing.

The invention here comprises a top member 38 having an axial opening 39 for receiving the shank 40 of the cap 37 said top member having a depending annular flange 41 whereby said member 38 substantially encompasses the housing, said flange 41 being provided with internal threads 42. The flange 41 receives the upstanding externally threaded annular flange 43 of a cup-shaped bottom member 44 which latter snugly encompasses the lower portion 36 of the housing and has an axial opening 45 for accommodating the sleeve portion 36ª. A case-hardened transverse pin 46 passes through the flanges 41 and 43 and thus locks them against separation.

Where assembly requires, the bottom member may be cast or stamped in two halves, one of which is shown in Figure 4, and each half, as shown, is then provided with complemental alternative notches 47 and tongues 48 for additionally preventing their separation.

Referring now to the modified form of this invention shown in Figures 5 and 6, and with reference first to Figure 5, the lower part 9ᵇ of the housing is similar in construction and may contain the same mechanism as that shown in Figure 1, the upper end of the part 9ᵇ being externally threaded as at 12ª. The upper part or cover 14ª contains a lock mechanism 23ª, and mounts a wheel 28ª.

An annular flange 15ª is formed integrally with the cover or top part 14ª and is internally threaded at 16ª for engagement with the threads 12ª, and a case-hardened steel pin 49 engages through the flange 15ª and into the threaded portion of the flange of the lower portion 9ᵇ for an obvious purpose.

A locking abutment which here takes the form of a ring 50, engages the bottom of the portion 9ᵇ, said ring being slightly concavo-convex and provided with an axial opening 51 for accommodation of the sleeve 9ᶜ. The ring 50 is provided with threads 52 for engagement with the adjacent threaded portion of the flange 15ª, and as shown in Figure 5, a case-hardened steel pin 53 engages the adjacent threaded portions of the flange 15 and the ring 50 for preventing removal of the ring.

Where the application of the ring requires, the latter may be divided into two parts, 50ª and 50ᵇ, as shown in Figure 6, and the adjacent abutting ends of the sections provided with complemental alternative pins and sockets 54 and 55, respectively, which serve to interlock such sections.

The device illustrated in Figures 7 and 8 is, in some respects, similar to that shown in Figure 5, the device here comprising the housing bottom portion 56 having a sleeve 57, and the externally threaded upstanding flange 58; the cover member 59 having the lock mechanism 60 and wheel 61, and said cover being provided with an annular depending flange 62 which fits over and is internally threaded at 63 for a portion of its surface, for engagement with the threaded flange 58. However, in this instance the flange 62 is provided with an internal reduced portion forming a recess 64 for reception of the reduced portion 65 of an upstanding flange 66 formed on the bottom member 67. The fit of the flange 65 in the recess 64 is snug and tight and may be made under pressure or by a sweating process. It will be observed that the flanges 65 and 62 having snug engagement in fact, to the point of affording effectually an integral body, separation of these parts is rendered impossible, at least, without extreme difficulty. The bottom member 67 is provided with a collar 68 which encircles the sleeve portion 57, and, if desired, the bottom member 67 may be made in two sections as is done in the forms of this invention previously described. A case-hardened pin 67ª prevents separation of the member 59 and flange 58.

In Figures 9 and 10 an arrangement is shown embodying some of the features already pointed out. Here the same housing construction as that shown in Figure 3 is provided with a modified form of protective casing, which latter comprises the bottom section 70 having a bottom annular flange 71 abutting the bottom of the casing 36 and encircling the shank 36ª, a similar top flange 72 abutting the top section or cover 37 and encircling the shank 40. A cap or closure member 73 having a depending annular flange 74 embraces the bottom section 70 and is in tight surface engagement therewith. The bottom section 70 is made preferably in two parts, each a half-section, and the closure member 73 serves to hold said sections together. The closure member 73 is provided with an upstanding axial annular flange 75 which embraces the shank 40 and is received in a complemental groove in the wheel hub 76, and said closure member 73 is thus held against displacement. In order to maintain the parts 70 and 73 against vibration, a plurality of rubber or other semi-resilient abutments 77 are provided on the flange 72, between said flange and the top member 73, and in contact with the latter. The wheel hub prevents upward displacement of the closure member 73, and thus the bottom member 70 cannot be readily displaced, these elements preventing unauthorized separation of the parts 36 and 37 of the housing.

Having thus described my invention, and illustrated its use, what I claim as new and desire to secure by Letters Patent is:

1. In combination, wheel, a shaft, a housing, means in said housing for connecting said shaft and wheel, said housing comprising annularly spaced sections, an annulus arranged between said sections, and means encompassing one of said sections and engaging said annulus.

2. In combination, wheel, a shaft, a housing, means in said housing for connecting said shaft and wheel, said housing comprising annularly spaced sections, an intermediate element between and connecting said sections, and means encompassing one of said sections and engaging said intermediate element.

3. In combination with a housing cover adapted to fit over and cover the housing of a planetary gearing of a steering gear, an intermediate member between and connecting said cover and housing, and a bottom member fitted within the lower end of said housing cover.

4. In combination with a housing cover adapted to fit over and cover the housing of a planetary gearing of a steering gear, an intermediate member between and connecting said cover and housing, and a bottom member fitted within the lower end of said member fitted within the lower end of said housing cover and in engagement with said intermediate member.

5. In combination with a housing cover adapted to fit over and cover the housing of a planetary gearing of a steering gear, an intermediate member between and connecting said cover and housing, and a bottom member encompassing the housing and engaging with said intermediate member.

6. In combination with a housing cover adapted to fit over and cover the housing of a planetary gearing of a steering gear, an intermediate member between and connecting said cover and housing, and a bottom member fitted within the lower end of said cover and encompassing the housing.

7. In combination with a housing cover adapted to fit over and cover the housing of a planetary gearing of a steering gear, an intermediate member between and connecting said cover and housing, and a two-part bottom member encompassing the housing and engaging with said intermediate member.

8. In combination with a housing cover adapted to fit over and cover the housing of a planetary gearing of a steering gear, an intermediate member between and connecting said cover and housing, and a divided member encompassing the housing and engaging with said intermediate member.

9. In combination with a housing cover adapted to fit over and cover the housing of a planetary gearing of a steering gear, an intermediate member between and connecting said cover and housing, and a bottom member fitted within the lower end of said cover and engaging said intermediate member and having a portion encompassing the housing.

10. In combination with a housing cover adapted to fit over and cover the housing of a planetary gearing of a steering gear, an intermediate member between and connecting said cover and housing, and a bottom member fitted within the lower end of said housing cover and in fixed engagement with said intermediate member.

11. In combination with a housing cover adapted to fit over and cover the housing of a planetary gearing of a steering gear, an intermediate member between and connecting said cover and housing, and a bottom member encompassing the housing and fixedly engaging with said intermediate member.

12. The combination with a housing having a closure, adapted to fit over one end of the housing, of an intermediate member between and in fixed engagement with said housing and closure, and a closure member fitted within one end of said closure and fixedly engaging said intermediate member.

13. The combination with a housing cover adapted to fit over and cover a housing containing connectible elements, of an intermediate ring between and connecting with said cover and housing, and a divided bottom member fitted within the lower end of said cover and engaged with said ring whereby to hold the parts of said bottom member together.

14. In combination with a housing cover adapted to fit over and close the housing of a planetary gearing, of a locking element between and in threaded connection with said housing and cover, and a protecting element encompassing said housing and engaged with said locking element.

15. The combination with a housing comprising a bottom section and a closing cap, of a top member encompassing one part of said housing, and a bottom member encompassing another part of said housing and fitting within said top member.

16. The combination with a housing and a closure fitting over said housing, of a top member in engagement with said housing, and a bottom member fitting over said housing and engaging said top member.

17. The combination with a cover member adapted to fit over and close the housing of a gearing, of a top member engaging said cover member, and a multi-part bottom abutment member encompassing the housing and engaged with said top member, said cover member serving to hold the parts of said bottom member together.

18. In a device of the character described, in combination, a cover member adapted to fit over and engage a housing, and a bottom member encompassing the lower portion of said housing and fitting in the lower end of said cover member.

19. In combination, a wheel, a shaft, a housing, means in said housing for connecting said shaft and wheel, said housing comprising annularly spaced sections, an annulus arranged between and connecting said sections, said annulus having a groove, and means encompassing one of said sections and engaging in said groove.

20. In combination, a wheel, a shaft, a housing, means in said housing for connecting said shaft and wheel, said housing comprising annularly spaced sections, an annulus arranged between and connecting said sections, said annulus having a groove, and a divided closure member encompassing one of said sections and engaging in said groove.

In testimony whereof, I affix my signature at 36 W. Randolph St., Chicago, Illinois.

JOHN B. BLEOO.